Jan. 16, 1962   W. D. ANDERSON ETAL   3,016,598
METHOD OF MAKING DENSE REFRACTORY OBJECTS
Filed Sept. 30, 1958
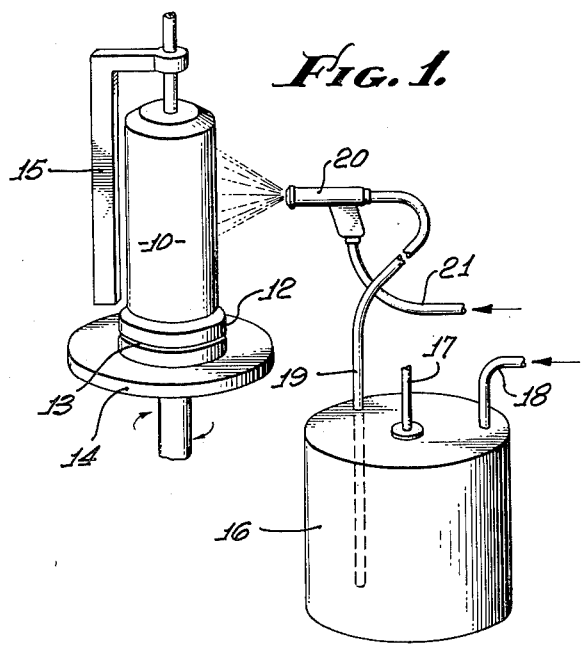
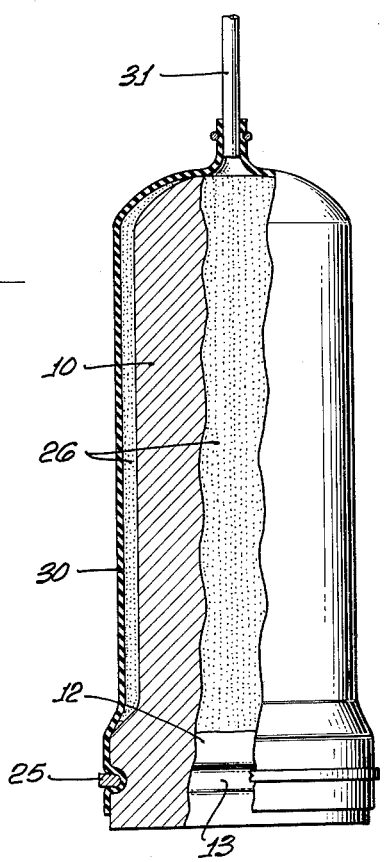
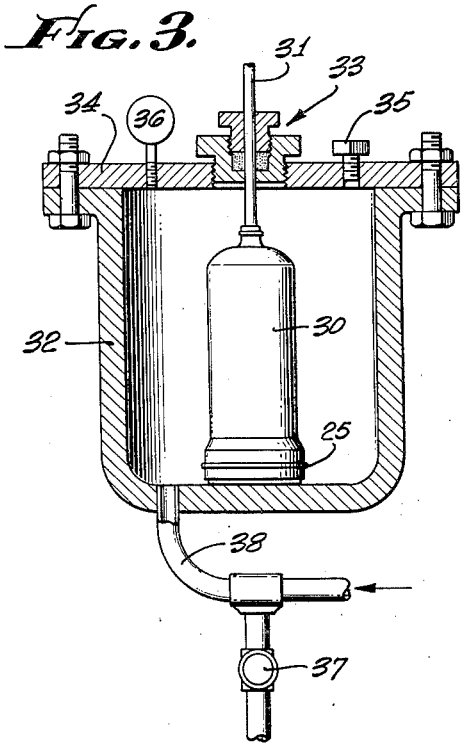
WILLIAM D. ANDERSON,
WILLIAM O. BRANDT,
LEON J. LeCLERCQ,
JARVIS J. FARGO,
INVENTORS.
BY Miketta and Glenny
ATTORNEYS.

_3,016,598_
METHOD OF MAKING DENSE REFRACTORY OBJECTS
William D. Anderson, La Crescenta, Calif., William O. Brandt, Denver, Colo., and Leon J. Le Clercq, Glendale, and Jarvis J. Fargo, La Crescenta, Calif., assignors to Gladding, McBean & Co., Los Angeles, Calif., a corporation of California
Filed Sept. 30, 1958, Ser. No. 764,352
6 Claims. (Cl. 25—156)

The present invention relates to a method of making very hard, dense, uniformly compacted, strong objects composed essentially of very refractory oxides. The resulting bodies are of very high specific gravity or density, are extremely strong, have a very minor and insignificant porosity or absorption and are characterized by uniform, excellent electrical transmission characteristics and a high dielectric constant.

Modern technology requires various reactors, reaction chambers and other articles which are capable of withstanding extremely high temperatures without any appreciable loss in strength. These refractory articles and objects cannot be made of metals since most metals known to us lose their strength very rapidly at temperatures of say 2000° F. In many nuclear reactions, it is necessary to conduct the reaction in chambers, retorts, tubes and the like at temperatures on the order of 3000° F. and higher. Furthermore, with the advent of flight into outer space and the desirability of re-entry into the atmosphere, it is necessary to provide component parts for missiles as well as other aircraft which are capable of withstanding tremendous thermal shocks and maintaining strength at very high temperatures. In many instances these various articles and component parts of guided missiles and other aircraft must have very good electrical characteristics for the purpose of permitting transmission of S.H.F., radar and other wave forms of energy which are used in orienting, guiding or controlling the flight of such missiles and aircraft. In order to attain all these desirable characteristics it has been found necessary to employ refractory materials or oxides and not metals. The present invention is directed towards methods of making these extremely strong, high temperature resistant and electrically satisfactory elements and components, even though some of the components are large in size.

It is recognized that ceramic objects have been made heretofore by a number of different methods including dry pressing, wet pressing, jiggering, and casting. None of these methods are capable of producing articles of the required size, density, homogeneity and temperature resistance required of the articles to which this invention is directed. Most of the prior methods employed in the ceramic industries require the use of plasticizers, plastic clays and other substances which contain alkaline components, such as alkaline components reducing the melting point of the more reactive constituents of a ceramic body and thereby bonding such constituents together. In order to attain the dielectric constants, hardness, density and resistance to thermal shock which is required for the objects of the present invention, plastic clays and reactive alkalies should be virtually absent.

Generally stated, therefore, the present invention is directed to a method of making articles composed essentially of aluminum oxide, titanium oxide, magnesium oxide or zirconium oxide. Although the metallic ions mentioned constitute the major constituents (over 95% and ofter 98%–99%) of the finished article, and are generally utilized in the form of oxides, they may also be derived, in part at least, from their halides, hydroxides, sulfates and other salts. In addition, the compositions used in making these articles may contain mineralizing constituents which exert their effect during firing on crystal growth, consolidation of crystals without entrapped bubbles or voids, and enhance the density, strength and refractoriness of the finished article. Magnesium chloride or hydroxide, barium sulfate, lithium chloride, calcium fluoride, and other halides of these and other metals such as manganese and chromium may be used both as mineralizers and sources of essential refractory oxides. The method of manufacture hereinafter disclosed is distinguished by the formation of an article from such typical ceramic refractory oxides in a state of extremely fine subdivision, these refractory oxides being deposited as an atomized suspension in a volatile nonaqueous vehicle upon a hard, impervious, rigid core or mandrel to form an article having the desired wall thickness. The oxides thus deposited upon the mandrel are dried and rendered extremely compact and dense by the application of fluid pressure. Thereafter the formed articles are removed from the central mandrel and suitably fired as will be described in greater detail hereinafter.

It is an object of the invention therefore to disclose and provide a method of forming refractory, strong and dense objects composed essentially of refractory oxides.

A further object of the invention is to disclose and provide a method of making large accurately dimensioned objects having a density in excess of 92% of the density of the pure refractory oxide employed in its manufacture, such formed objects also being characterized by extremely high strength, resistance to thermal shock, dimensional stability and ability to transmit radar and infrared frequencies without appreciable distortion.

An object of the invention furthermore is to disclose and provide large, dense and uniform articles composed essentially of refractory oxides from the group consisting of alumina, magnesia, titanium and zirconium.

An object of the present invention moreover is to disclose and provide a mode of operation and a sequence of steps wherein refractory oxides in finely divided form may be converted into coherent, strong and dense objects.

A further object is to disclose conditions and steps whereby firing shrinkage of refractory ceramic objects may be greatly reduced.

A still further object of the invention is to disclose and provide a method of converting very finely divided refractory oxides into formed objects, without the necessity of employing plastic clays or low melting alkalis and reagents, and insuring uniformity by a sequence of vacuumizing and hydropressing steps.

These and various other objects, advantages and adaptations of the invention will become apparent from the following description of certain exemplary bodies and modes of procedure. In order to illustrate and facilitate understanding of the invention, reference will be had to the appended drawings, in which:

FIG. 1 somewhat diagrammatically represents an initial step in the formation of a tubular object in accordance with the method herein disclosed.

FIG. 2 is an enlarged side elevation partly in section of a tubular object being subjected to a vacuumizing step after the initial forming operation.

FIG. 3 diagrammatically illustrates a hydropressing step in the process.

As previously indicated, the most desirable and useful refractory oxides are those of alumina, magnesia, zirconia and titanium. Alumina, $Al_2O_3$ is preferably used in a prefused and then ground condition. It is very refractory and has a melting point of over 3600° F. The magnesia oxide is also preferably electrically fused and finely ground and in such condition is stable and relatively inactive and has the same melting point as periclase (about 5000° F.). Zirconia, $ZrO_2$ and titanium oxide are also adaptable for use in the methods of this invention. In addition, the body compositions may contain other oxides or salts or compounds of metals resulting in refractory oxides (such as chromic oxide, manganese oxide, cobalt oxide, nickel oxide, zircon, etc.) or performing the functions of a mineralizer (such as the halides of lithium, magnesium, calcium, barium, etc.) or acting in both capacities (as in the case of aluminum and magnesium chloride and hydroxide). Very small and almost insignificant quantities of other ceramic materials such as talc and clay may be added to the compositions, but the total quantity of talc, clay or other semi-refractory but non-mineralizing materials should not exceed 4% and is preferably maintained under 2%.

In all instances the refractory oxides which constitute the major and essential portion of the ceramic body (as well as all other components) are ground to extreme fineness of subdivision. The average particle size of such oxides should be finer than material passing a 325 mesh sieve and preferably comprise particles having an average dimension on the order of less than 25 microns. The particle size of these oxides within the range of 25 microns or 10 microns and 1 micron in average dimension may be classified or graded so as to obtain a dense resultant structure. Submicron particles are not excluded.

Although in normal ceramic practice, ceramic components are generally suspended or wetted with aqueous solutions of water, we have found it desirable to employ organic liquids, and to suspend the refractory oxides (and other components) in such organic liquids to form a relatively heavy suspension. The solvent employed should be relatively volatile and may be a ketone, an ester, ether or an alcohol. Chlorinated solvents and petroleum solvents are not favored but are not excluded. In forming this suspension, it is desirable to employ a small quantity of a resin to impart coherence to the article when first formed and therefore the solvent utilized should be a solvent for the resin employed. Various resins may be used, among them being the acrylic, alkyd, vinyl, polyvinyl, polystyrene, cumar indene, ethylcellulose or other cellulosic resins such as cellulose acetate, propionate, etc. It is to be noted moreover that most of the preferred resins are thermoplastics; the solvents therefor should have a boiling point not over about 200° F.

The materials hereinbefore referred to are first compounded to form a suspension or slip. Such suspension or slip preferably comprises 60% to 80% and generally 65% to 75% of the inorganic solids (which may consist of from between 95% and 99% of the refractory oxides and from 1% to 5% of talc, clay or mineralizers) and from about 18% to 40% by weight of a solution of resin and suspending agent in the selected volatile organic solvent (such solution containing from 10% to 25% of the resin by weight of acetone and from 0% to 10% of a suspending agent). As suspending agents reference is made to substances such as collodion, ethyl- or hydroxy-cellulose, or other cellulosic derivative or material which exerts a suspending and deflocculating effect and will be automatically removed in the early stages of subsequent firing without detrimental effect. In preparing such suspensions, it is desirable to make a relatively concentrated resin solution in the acetone, or other solvent, separately thoroughly wet the inorganic solids other than the refractory oxides in a separate portion of the solvent, combine the wetted inorganic solids with the resin solution then add the refractory oxides in a state of very fine subdivision and finally add whatever suspending agent or wetting agent it is desired to use in the slip. In some cases a surfactant may be added to the solvent before incorporating the solids, to facilitate elimination of air absorbed on the surfaces of the solid particles. The entire mixture is then thoroughly agitated until a homogeneous uniform suspension is obtained. As previously stated, all materials are less than 25 microns in average dimension.

The suspension is then sprayed upon a rigid hard smooth surfaced mandrel of the desired shape and size, the mandrel establishing the inner dimensions of the final object to be formed. A mandrel adapted to form a cylindrical retort or furnace tube is illustrated in FIG. 1 at 10 and it will be noted that such mandrel is provided with a cylindrical body portion, a curved or convexed top 11 and an enlarged base 12 including a locking groove 13. The mandrel may be made of any suitable metal and in many instances it is desirable to chromium plate the mandrel in order to provide an extremely smooth hard surface. Such mandrel 10 is positioned upon a rotatable table 14 in a suitable spray booth and the mandrel is rotated at a relatively slow speed about its longitudinal axis, say at a speed of from 15 to 30 r.p.m.

The refractory suspension, made as previously described, is contained in a pressure vessel 16 provided with an agitator 17, a source of air pressure 18 and an outlet line 19 leading to a spray gun 20 which may be also provided with an auxiliary high pressure air line 21. It is desirable to maintain uniform air pressures supplied to the lines 18 and 21. The spray gun 20 is preferably provided with a fish-tail type of nozzle arranged to deliver a spray in a vertical plane and the suspension is sprayed upon the slowly rotating mandrel, the spray nozzle being moved along a plane passing through the vertical axis of the mandrel in a uniform manner so as to leave a uniform deposit of the body material contained in the suspension on the surface of the mandrel. It is desirable to start the spraying operation with a spray gun at some distance from the mandrel, that is, at a distance of say 2 to 2½ feet, and as the deposit increases in thickness the spray gun may be moved closer to the surface of the mandrel so that at the conclusion of the operation the spray gun may be only 6 inches from the surface of the mandrel. Since a volatile solvent is employed a relatively dry coating is aplied to the mandrel, a large proportion of the solvent vaporizing during its passage from the spray gun to the surface of the mandrel. The suspension in tank 16 may be maintained at a constant pressure within the range 3 lbs. to 15 lbs. p.s.i., while air at a pressure of 30 to 50 p.s.i. is supplied to the nozzle through line 21, to insure fine atomization and accelerate the vaporization of the solvent. The very finely divided particles of the refractory oxides contained in such suspension are therefore impacted upon the mandrel and form a dense, compact coating, which is temporarily bound and held together by the content of resin in the suspension. It may be observed that the rate at which the mandrel rotates, the pressure of auxiliary air and the distance of the spray nozzle from the mandrel are correlated to obtain a deposit on the mandrel which is insufficiently wet with solvent to exhibit plastic deformation or movement nor so dry as to produce laminations. The build-up of the deposit is continued and its desired thickness and uniformity established by a fixed template (or doctor blade) diagrammatically illustrated at 15 in the drawing.

After a deposit of suitable thickness has been thus formed on the rigid, impervious mandrel, the entire mandrel is permitted to stand and dry at room temperature until substantially all of the volatile materials contained in the deposit have evaporated. Thereafter the deposited article (carried on the mandrel) is encapsulated and covered with a compliant, impervious envelope. By referring to FIG. 2, it will be seen that the mandrel 10 (now covered by the compacted refractory article in its dried form indicated at 26) is enclosed, encapsulated, covered, and sealed within the preferably preformed, compliant, resilient and impervious envelope 30, which can be made of heavy rubber or rubber composition or other suitable, flexible, resilient material. This envelope 30 is provided at its upper end with a conduit connection 31 adapted to be operably connected to a source of vacuum. The lower end of the envelope 30 extends over the groove 13 formed in the base of the mandrel and is sealed to the mandrel by extending into such groove and being compresesd therein by means of a suitable clamping or sealing ring indicated at 25. After the envelope has been sealed to the mandrel the conduit 31 is connected to a source of vacuum and the deposited material on the mandrel is subjected to a vacuum of not less than 25 inches of mercury and preferably on the order of 30 inches of mercury for a time sufficient to completely withdraw all the vaporizable components that may be contained within the body of material 26. During this application of vacuum, it appears that a certain compacting of the material takes place and all air as well as vaporizable components are removed from between the interstices of the particulate matter which makes up the deposited body 26. Ambient atmospheric air pressure assists in compacting this body.

Thereafter the entire assembly illustrated in FIG. 2 is placed within a pressure vessel such as the one diagrammatically illustrated in FIG. 3. The conduit 31 may be provided with a valve immediately adjacent the envelope 30 and such valve closed, the remaining portion of the conduit 31 disconnected and the assembly of mandrel, deposited body and envelope placed with the pressure vessel 32, with a sub-atmospheric pressure retained within the envelope. Alternatively, the conduit 31 may remain connected to the envelope and extend through suitable packing glands 33 formed in the cover 34 of the pressure vessel so that continuing evacuation of the material within the envelope can take place during the subsequent hydropressing. Plug 35 is removed and the pressure vessel filled completely with a suitable fluid such as glycerine, mineral oil or other hydraulic fluid. The plug 35 is then locked into position and additional quantities of fluid pumped into the chamber 32 by means of suitable heavy pumps. Hydraulic pressure on the order of 30,000, 35,000 or 40,000 lbs. per square inch is thus generated within the pressure vessel 32 and imposed upon the outer surface of the envelope 30. This pressure is preferably raised slowly and gradually over a period of several hours. As previously indicated a constant source of vacuum may be applied to conduit 31 to the deposited body 26 of refractory oxides between the central mandrel and the outer envelope 30 during the entire period that the assembly is subjected to the hydrostatic pressure of the fluid. After the pressure reaches the desired maximum (as indicated by suitable pressure valve gauge 36), the pump is discontinued and the pressure gradually and slowly relieved by means of a valve 37 connected to the inlet line 38.

It appears that during this hydrostatic pressing, the individual grains and particles of the body 26 which has been deposited upon the mandrel are caused to shift with respect to each other and to come into a stable configuration, whereby the particulate matter assumes the densest possible relationship. This orientation is the result of the uniformly applied pressure. The hydrostatic pressing reduces the wall thickness of the unfired article by between about 40% to 60%. It may be mentioned at this time that care should be taken not to permit any of the hydraulic fluid itself to contact or impregnate the refractory body 26; the envelope 30 should be sufficiently thick and strong so as to withstand the pressures and transmit the hydraulic pressure uniformly over the entire surface of the deposited material 26 on the mandrel.

After the pressure has been relieved and liquid drained from the pressure vessel 32, the entire assembly is removed from the pressure vessel and the envelope 30 removed. It will be found that the formed article is dense, dry and readily removable from the mandrel itself. This formed but unfired article is now preferably subjected to a slow baking operation at temperatures sufficiently high so as to cook out and volatilize the small amount of resinous material which may be contained in the body. Temperatures of between 300° F. and 600° F. are adequate for this baking step. Preferably the temperatures are raised rather slowly, say at a rate of about 75° F. per hour until the maximum desired temperature is reached whereupon such temperature may be maintained for a period of say one hour and then the piece allowed to cool to room temperature.

The resulting baked and formed body may be lightly machined at this stage, prior to being subjected to a bisque firing. This bisque firing will vary somewhat in accordance with the particular refractory oxide which constitutes the essential component of the formed article, but usually such bisque firing is conducted at maximum temperatures of between about 2000° F. and 2500° F. It may be noted that cylindrical and conical objects are preferably fired while in a vertical position. After firing to the temperatures indicated, the article is permitted to cool and the shaped, bisque-fired article subjected to machining to secure closer tolerances and dimensions if desired. It is to be remembered that in many instances wall thicknesses must be held to within very close limits and desired flanges or other lips need be formed on the article. After such machining the article is subjected to a high firing; ordinarily this subsequent firing is to a temperature in excess of 3000° F. Articles composed essentially of alumina are normally fired to a temperature of between about 3100° F. and 3200° F. and soaked at this temperature for one to two hours. The entire firing schedule should cover approximately 48 to 60 hours and the piece is then allowed to cool to room temperature and may be surface ground if desired. In every instance the final firing is to a temperature and for a time sufficient to mature the body composition and obtain a sintering which develops optimum physical properties in the fired article: this firing temperature will vary with the refractory oxides employed, the character of the mineralizing agents present and the intended use of the finished article. Neutral firing atmospheres containing some water vapor appear desirable with substantially pure refractory oxide bodies. It may be noted that the manufacturing procedure herein disclosed reduces the firing shrinkage to a very small quantity (one-half or less of that which would normally be expected) thereby permitting the manufacture of articles which conform very closely to specified sizes and tolerances.

A specific example directed to the production of radomes for guided missiles may be cited. These radomes were formed on mandrels having the desired conical configuration. The inorganic body materials comprised 97% by weight of fused and ground alumina, approximately one-half being of so-called 500 mesh size and the other half of so-called 900 mesh size. In addition, the body contained 2.25% by weight of a finely ground talc and 0.75% by weight of plastic kaolin. The suspension was formed with acetone as the solvent and a cumarone indene resin was dissolved therein together with a small percentage of collodion. The final suspension, as it was sprayed, contained 67.4% by weight of inorganic solids, 25.05% acetone, 2.18% of the cumar resin and 5.37% of collodion (as a solution of 4 g. pyroxylin, chiefly dinitrocellulose, in 100 ml. of alcohol and ether).

The radomes were manufactured by spraying the suspension upon the mandrel in the manner described hereinbefore; the sprayed objects were permitted to dry for a period of 48 hours at room temperature and then subjected to vacuum of 30 inches for a period of 20 minutes, the vacuum being applied after a butyl rubber envelope had been secured to the base of the mandrel and enveloped the formed article. The envelope was sealed to retain the vacuum within the envelope; the assembly was then placed in the pressure vessel and subjected to a maximum pressure of 35,000 lbs. p.s.i. during a period of two hours. Thereafter the radomes were baked at an initial temperature of 200° F. and a final temperature of 550° F. at which temperature the radomes were held for one hour before being allowed to cool. The baked formed bodies were then bisque fired to a maximum temperature of 2150° F., machined to secure closer tolerances and dimensions in accordance with preformed templates and then refired to a maximum temperature of 3100° F.

The missile radomes made from the composition stated and in the manner recited had a modulus of rupture of 32,000 p.s.i. and a modulus of elasticity of $420 \times 10^5$. They had an absorption of less than 0.2% (substantially zero) and a bulk specific gravity of 3.55. The dielectric constant of the bodies at 8600 megacycles and 68° F. was 8.57, and the loss tangent was only 0.0023. These alumina radomes have shown remarkably uniform transmission rates (on the order of above 95%) to radar frequencies within the X band. The coefficient of thermal expansion at 900° F. was $4.41 \times 10^{-6}$ and $4.81 \times 10^{-6}$ in./in./° F. at 1400° F. Particular attention is drawn to the fact that the bulk specific gravity (density) of the completed article was 89.5% of the theoretic density of pure aluminum oxide and 92% of the theoretical density of the refractory oxides in the composition.

Fired objects having physical and electrical properties of enhanced characteristics are obtained by the virtual elimination of the minor proportion of normal ceramic components (such as talc and clay in the above example) and the use of mineralizing components. When such mineralizing components are employed (or when a portion of the refractory oxides are derived from normally water-soluble compounds such as halides of magnesium, aluminum hydroxide, or the like), the density of the hydropressed but unfired article may be lower and the firing shrinkage higher than in cases where the body was spray-deposited from a composition containing the refractory metal ions in the initial form of oxides, but after firing it will be found that the mineralized body will produce an article of higher density. A part of this invention is directed to the formation of the desired refractory oxides in situ within the formed object during firing; the nascent or freshly formed oxides are more reactive and appear to consolidate more readily. Mineralizing components (such as lithium fluoride, for example) appear to facilitate the consolidation and absorption of crystals of alumina and expedite the rate at which bubbles and gases move out of the body. More homogeneous, denser and stronger finished objects are attained.

In accordance with the procedure described hereinabove and the teachings stated, reactor tubes can be made by spray-depositing a body upon an impervious mandrel from a suspension containing about 70% of inorganic solids (composed of 99.3% alumina, 0.2% lithium chloride and 0.5% magnesia) in 30% acetone solution by weight of total suspension containing resin and a defloculating agent. The mineralizing components can be used directly or they may be mixed, precalcined, reground and then added to the suspension. After drying, vacuumizing, hydro-pressing and firing to a temperature of 3200° F., the fired objects will exhibit a density of almost 98% of theoretical density of alumina oxide.

Zirconium oxide articles of exceptional properties have been made from organic solvent suspensions containing, as the sole inorganic constituents, mixtures of zirconium oxide in monoclinic and cubic crystalline form. An illustrative mixture is 3 parts by weight of zirconium oxide in cubic crystalline form (stabilized with calcium oxide) to 2 parts by weight of zirconium oxide in monoclinic crystalline form. The minor amount of CaO may be termed a mineralizing and stabilizing agent. Any of the volatile organic solvents previously mentioned, containing a desired solvent soluble resin, wetting agent or surfactant and defloculant, may be used in forming a suspension which is then sprayed to form the desired object and the object then handled in the manner described hereinbefore.

In order to obtain fired, complete articles in which the desired physical and electrical properties are developed to their optimum, the inorganic solids content of the suspension should consist of the highest possible proportion of refractory oxides or source materials for such refractory oxides, i.e., it is desirable that 96% to 99% of such inorganic solids content consists of the refractory oxide or oxides. The methods herein disclosed are not limited in their usefulness to such optimum conditions however and can be used to great advantage with suspensions wherein the inorganic solids of the initial suspension contain 90% or even only 80% refractory oxides, the remainder being composed of less refractory ceramic raw or precalcined materials or metallic oxides, powders, etc., depending upon the use to which the completed fired article is designed.

We claim:

1. A method of making hard, dense, uniformly compacted and strong hollow objects formed essentially of refractory oxides, comprising: forming a suspension of inorganic solids comprising not less than 95% of finely divided, substantially inert refractory oxides in an organic solvent having a boiling point of not over 200° F., said solvent containing an adhesive resin in solution; pressure spraying such suspension upon a rigid, smooth-surfaced and non-absorptive mandrel to form a deposit of desired thickness of said inorganic solids on the surface of the mandrel; drying the deposit material on the mandrel; encapsulating said deposited material with a compliant impervious envelope; subjecting the deposited material to the action of vacuum to remove virtually all volatile material; then hydropressing the dry deposit while on said mandrel to compact and orient the refractory oxides in such deposited material; removing the article composed of such hydropressed and deposited material from the mandrel and subjecting the article to baking and firing steps.

2. In a method of reducing firing shrinkage during the manufacture of dense, dimensionally accurate refractory objects composed essentially of refractory oxides, the steps of: forming a deposit of finely divided refractory oxides upon a rigid, non-absorptive mandrel, said finely divided oxides being bound into a coherent deposit by a small amount of resinous material; encapsulating said deposited material with a compliant impervious envelope; subjecting the deposited material to the action of a vacuum on the order of 30 inches of mercury to remove substantially all volatile material; then subjecting the encapsulated deposited material, while on said rigid mandrel, to a uniformly applied pressure in excess of about 30,000 p.s.i. to mechanically compact said deposit; and subsequently removing the compacted material and subjecting it to firing at a temperature adapted to sinter and mature the material.

3. A method as stated in claim 1 wherein the major proportion of the particles of the refractory oxides employed in forming the deposit have an average dimension of less than 25 microns and a proportion of said particles have an average dimension of 1 micron.

4. A method as stated in claim 2 wherein the deposit formed upon the non-absorptice mandrel includes mineralizing agents and materials adapted to form refractory oxides upon firing.

5. In a method of producing dense and strong refractory articles, the steps of: forming a suspension of finely divided inorganic ceramic materials in an organic solvent containing a resin in solution, such suspension comprising between 60% and 80% by weight of the inorganic materials, between 2% and 8% by weight of a synthetic organic resin in solution, and between 18% and 40% of an organic solvent having a boiling point not over 200° F.; spraying said suspension upon a rigid, non-absorptive support to deposit the inorganic solids thereon; drying the deposited solids; subjecting the deposited solids to the action of a vacuum on the order of 30 inches of mercury to remove substantially all volatile material; covering the deposited solids with a compliant envelope; and subjecting the deposited solids while on said rigid support through said envelope to fluid pressures of at least 30,000 p.s.i.

6. A method of making hard, dense, uniformly compacted, strong and hollow objects formed essentially of refractory oxides, comprising: forming a suspension of inorganic solids comprising not less than 95% of finely divided, substantially inert refractory oxides in an organic solvent having a boiling point of not over 200° F., said solvent containing an adhesive resin in solution; pressure spraying such suspension upon the outer surface of a rigid, smooth-surfaced and non-absorptive mandrel to form a deposit of desired thickness of said inorganic solids on the surface of the mandrel; drying the deposit material on the mandrel; encapsulating said deposited material with a compliant impervious envelope; subjecting the deposited material to the action of a vacuum to remove virtually all volatile material; hydropressing the dry deposit while on said mandrel to compact and orient the refractory oxides in such deposited material; removing the article composed of such hydropressed and deposited material from the mandrel; firing said article to between about 2000° F. and 2500° F.; machining said article to the desired dimensions; and then subjecting said article to a second stage firing at a temperature in excess of about 3000° F.

References Cited in the file of this patent

UNITED STATES PATENTS

| | | |
|---|---|---|
| 1,281,405 | Marquess | Oct. 15, 1918 |
| 1,346,638 | Crook et al. | June 13, 1920 |
| 1,795,875 | Maynard | Mar. 10, 1931 |
| 1,862,191 | Meth | June 7, 1932 |
| 2,091,569 | Ridgway et al. | Aug. 31, 1937 |
| 2,152,738 | Jefferey | Apr. 4, 1939 |
| 2,270,075 | Miller | Jan. 13, 1942 |
| 2,272,338 | Fessler et al. | Feb. 10, 1942 |
| 2,781,273 | Koch | Feb. 12, 1957 |
| 2,809,126 | Murphy et al. | Oct. 8, 1957 |

OTHER REFERENCES

Kingery: Ceramic Fabrication Processes, John Wiley and Sons (1958), pp. 58 and 147–171.

"Ceramic Fabrication Processes," pp. 71 and 72, W. D. Kingery, editor, published by Technology Press of MIT and John Wiley and Sons, received in Scientific Library, Apr. 11, 1958.